United States Patent
Horichi et al.

(10) Patent No.: US 7,192,672 B2
(45) Date of Patent: Mar. 20, 2007

(54) PROCESS FOR PRODUCING POSITIVE ELECTRODE ACTIVE MATERIAL FOR LITHIUM SECONDARY BATTERY

(75) Inventors: Kazushige Horichi, Chigasaki (JP); Manabu Suhara, Chigasaki (JP); Naoshi Saito, Chigasaki (JP); Megumi Uchida, Chigasaki (JP)

(73) Assignee: Seimi Chemical Co., Ltd., Chigasaki (JP)

( * ) Notice: Subject to any disclaimer, the term of this patent is extended or adjusted under 35 U.S.C. 154(b) by 0 days.

(21) Appl. No.: 11/136,493

(22) Filed: May 25, 2005

(65) Prior Publication Data

US 2005/0214645 A1     Sep. 29, 2005

Related U.S. Application Data

(63) Continuation of application No. PCT/JP03/15283, filed on Nov. 28, 2003.

(30) Foreign Application Priority Data

Nov. 29, 2002   (JP)   .............................. 2002-348289

(51) Int. Cl.
    *H01M 4/00*   (2006.01)
(52) U.S. Cl. .................... 429/128; 429/209; 429/231.3; 429/231.95
(58) Field of Classification Search ................ 428/128; 429/128, 209, 231.3, 231.95
    See application file for complete search history.

(56) References Cited

U.S. PATENT DOCUMENTS 6,617,073 B1 * 9/2003 Matsumoto et al. ..... 429/231.3

2004/0213729 A1   10/2004 Suhara et al.

FOREIGN PATENT DOCUMENTS

| JP | 3-201368   | 9/1991  |
|----|------------|---------|
| JP | 6-243897   | 9/1994  |
| JP | 10-72219   | 3/1998  |
| JP | 10-312805  | 11/1998 |
| JP | 2000-82466 | 3/2000  |
| JP | 2002-37629 | 2/2002  |
| JP | 2002-60225 | 2/2002  |
| JP | 2002-75369 | 3/2002  |
| JP | 2003-2660  | 1/2003  |

* cited by examiner

*Primary Examiner*—Patrick Joseph Ryan
*Assistant Examiner*—Jane Rhee
(74) *Attorney, Agent, or Firm*—Oblon, Spivak, McClelland, Maier & Neustadt, P.C.

(57) ABSTRACT

To provide a process for producing a lithium-cobalt composite oxide for a positive electrode of a lithium secondary battery, which has a large volume capacity density, high safety, high charge and discharge cycle durability, high press density and high productivity.

A process for producing a lithium-cobalt composite oxide represented by the formula $Li_pCo_xM_yO_zF_a$ (wherein M is a transition metal element other than Co, or an alkaline earth metal element, $0.9 \leq p \leq 1.1$, $0.980 \leq x \leq 1.000$, $0 \leq y \leq 0.02$, $1.9 \leq z \leq 2.1$, $x+y=1$, and $0 \leq a \leq 0.02$), characterized in that as a cobalt source, a mixture is used which comprises cobalt hydroxide in the form of substantially spherical secondary particles with an average particle size of from 8 to 20 μm formed by agglomeration of primary particles and tricobalt tetroxide in the form of secondary particles with an average particle size of from 2 to 10 μm formed by agglomeration of primary particles, in a cobalt atomic ratio of from 5:1 to 1:5, and firing is carried out at from 700 to 1,050° C.

8 Claims, No Drawings

PROCESS FOR PRODUCING POSITIVE ELECTRODE ACTIVE MATERIAL FOR LITHIUM SECONDARY BATTERY

BACKGROUND OF THE INVENTION

1. Field of the Invention

The present invention relates to a process for producing a lithium-cobalt composite oxide for a positive electrode of a lithium secondary battery, which has a large volume capacity density, high safety, high charge and discharge cyclic durability, high press density and high productivity, a positive electrode for a lithium secondary battery containing the lithium-cobalt composite oxide thus produced, and a lithium secondary battery.

2. Discussion of Background

Recently, as the portability and cordless tendency of instruments have progressed, a demand for a non-aqueous electrolyte secondary battery such as a lithium secondary battery which is small in size and light in weight and has a high energy density, has been increasingly high. As a positive electrode active material for the non-aqueous electrolyte secondary battery, a composite oxide of lithium and a transition metal such as $LiCoO_2$, $LiNiO_2$, $LiNi_{0.8}Co_{0.2}O_2$, $LiMn_2O_4$ or $LiMnO_2$, has been known.

Among them, a lithium secondary battery using a lithium-cobalt composite oxide ($LiCoO_2$) as a positive electrode active material and using a lithium alloy or carbon such as graphite or carbon fiber as a negative electrode, can obtain a high voltage at a level of 4 V, whereby it has been widely used as a battery having a high energy density.

However, in the case of the non-aqueous type secondary battery using $LiCoO_2$ as a positive electrode active material, further improvement of the capacity density per unit volume of a positive electrode layer and the safety, has been desired. On the other hand, there has been a problem of deterioration of the cyclic properties such as gradual reduction of the battery discharge capacity due to repetitive charge and discharge cycle, a problem of the weight capacity density or substantial reduction of the discharge capacity at a low temperature.

In order to solve a part of these problems, it has been proposed in JP-A-6-243897 that the average particle size of $LiCoO_2$ as a positive electrode active material, be from 3 to 9 μm, the volume occupied by a group of particles having a particle size of from 3 to 15 μm, be at least 75% of the total volume, and the intensity ratio of the diffraction peaks at 2θ=about 19° and 45° as measured by means of X-ray diffraction using CuKα as a radiation source, be of a specific value, so that it becomes an active material excellent in the coating properties, the self-discharge properties and the cyclic properties. Further, in the document, it has been proposed that the positive electrode active material is preferably one which does not substantially have such a particle size distribution that the particle size of $LiCoO_2$ is 1 μm or smaller or 25 μm or larger. With such a positive electrode active material, the coating properties and the cyclic properties have been improved, but, the safety, the volume capacity density and the weight capacity density, have not yet been fully satisfactory.

Further, in order to improve the weight capacity density and the charge and discharge cyclic properties of the positive electrode, JP-A-2000-82466 proposes a positive electrode active material wherein the average particle size of lithium composite oxide particles is from 0.1 to 50 μm, and at least two peaks are present in the particle size distribution. Further, it has been proposed to mix two types of positive electrode active materials having different average particle sizes to prepare a positive electrode active material wherein at least two peaks are present in the particle size distribution. In such a proposal, there may be a case where the weight capacity density and the charge and discharge cyclic properties of the positive electrode can be improved, but on the other hand, there is a complication that the positive electrode material powders having two types of particle size distributions have to be produced, and one satisfying all of the volume capacity density, the safety, the coating uniformity, the weight capacity density and the cyclic properties of the positive electrode, has not yet been obtained.

Further, in order to solve the problem related to the battery characteristics, JP-A-3-201368 proposes to replace 5 to 35% of Co atoms with W, Mn, Ta, Ti or Nb to improve the cyclic properties. Further, JP-A-10-312805 proposes to use hexagonal $LiCoO_2$ as a positive electrode active material to improve the cyclic properties, wherein the c axis length of the lattice constant is at most 14.051 Å, and the crystal lattice size of (110) direction of the crystal lattice is from 45 to 100 nm.

Further, JP-A-10-72219 proposes that a lithium composite oxide of the formula $Li_xNi_{1-y}N_yO_2$ (wherein $0<x<1.1$, $0 \leq y \leq 1$), of which the primary particles are plate-like or columnar, the ratio of (volume basis cumulative 95% size—volume basis cumulative 5% size)/(volume basis cumulative 5% size) is at most 3, and further, the average particle size is from 1 to 50 μm, has a high initial discharge capacity per weight and further is excellent in the charge and discharge cyclic durability.

However, in the prior art, there has been no lithium secondary battery using a lithium composite oxide as a positive electrode active material, which sufficiently satisfies all of the volume capacity density, the safety, the coating uniformity, the cyclic properties and further the low temperature properties.

SUMMARY OF THE INVENTION

It is an object of the present invention to provide a process for producing a lithium-cobalt composite oxide for a positive electrode of a lithium secondary battery, which has a large volume capacity density, high safety, high charge and discharge cyclic durability, high press density and high productivity, a positive electrode for a lithium secondary battery containing the lithium-cobalt composite oxide thus produced, and a lithium secondary battery.

The present inventors have continued extensive studies to achieve the above object and as a result, have found it possible to accomplish the object by producing a lithium-cobalt composite oxide by using a mixture comprising cobalt hydroxide in the form of substantially spherical secondary particles with an average particle size of from 8 to 20 μm formed by agglomeration of primary particles and tricobalt tetroxide in the form of secondary particles with an average particle size of from 2 to 10 μm formed by agglomeration of primary particles, in a specific atomic ratio, as a cobalt source as a material for producing the lithium-cobalt composite oxide, and firing such a cobalt source, a lithium source and other metal sources at a temperature within a specific range.

The reason as to why the above object can be accomplished by adopting such a construction by the present invention is not necessarily clearly understood. However, it is considered that when, as the cobalt source, cobalt hydroxide and tricobalt tetroxide having the above-mentioned specific physical properties are used in a specific cobalt atomic ratio, the latter small particles will be inserted in spaces among the relatively large former particles, whereby as compared with a case where cobalt hydroxide and tricobalt tetroxide are independently used alone, the tap density of the cobalt source composed of the mixture of two types of the present invention will be remarkably high, and the productivity of a positive electrode for a lithium secondary battery to be produced from such a lithium-cobalt composite oxide will also be improved. Further, it is considered that the cobalt hydroxide having the above specific physical properties will form dense and substantially spherical electrode particles because of its reactivity, and when a pressure is exerted from outside, the compression stress to the dense and substantially spherical positive electrode particles derived from cobalt hydroxide will be efficiently transmitted to relatively brittle positive electrode particles derived from tricobalt tetroxide, whereby the particles will be broken and filled among the dense and substantially spherical positive electrode particles. As a result, the lithium-cobalt composite oxide composed of the mixture of the cobalt hydroxide and the tricobalt tetroxide is considered to be a highly dense compound having a high press density which can not be expected when the respective components are individually used as the cobalt sources.

Thus, the present invention provides the following constructions.

(1) A process for producing a lithium-cobalt composite oxide for a positive electrode of a lithium secondary battery, said lithium-cobalt composite oxide being represented by the formula $Li_pCo_xM_yO_zF_a$ (wherein M is a transition metal element other than Co, or an alkaline earth metal element, $0.9 \leq p \leq 1.1$, $0.980 \leq x \leq 1.000$, $0 \leq y \leq 0.02$, $1.9 \leq z \leq 2.1$, x+y=1, and $0 \leq a \leq 0.02$), which comprises firing a mixture comprising a cobalt source and a lithium source in an oxygen-containing atmosphere, characterized in that as the cobalt source, a mixture is used which comprises cobalt hydroxide in the form of substantially spherical secondary particles with an average particle size of from 8 to 20 µm formed by agglomeration of primary particles and tricobalt tetroxide in the form of secondary particles with an average particle size of from 2 to 10 µm formed by agglomeration of primary particles, in a cobalt atomic ratio of from 5:1 to 1:5, and the firing is carried out at from 700 to 1,050° C.

(2) The process according to the above (1), wherein the average particle size D50 after dispersing the secondary particles of cobalt hydroxide in pure water, is at most ¼ of the initial average particle size D50.

(3) The process according to the above (1) or (2), wherein in the X-ray diffraction spectrum using Cu-Kα-ray, of cobalt hydroxide, the half value width of the diffraction peak on (001) plane at 2θ=19±1° is from 0.18 to 0.35°, and the half value width of the diffraction peak on (101) plane at 2θ=38±1° is from 0.15 to 0.35°, and the specific surface area is from 5 to 50 m²/g.

(4) The process according to any one of the above (1) to (3), wherein the cobalt hydroxide has a press density of from 1.0 to 2.5 g/cm³.

(5) The process according to any one of the above (1) to (4), wherein in the X-ray diffraction spectrum using Cu-Kα-ray, of tricobalt tetroxide, the half value width of the diffraction peak on (220) plane at 2θ=31±1° is at most 0.5°, and the half value width of the diffraction peak on (311) plane at 2θ=37±1° is at most 0.5°, and the specific surface area is from 0.5 to 20 m²/g.

(6) The process according to any one of the above (1) to (5), wherein the lithium-cobalt composite oxide has a half value width of the diffraction peak on its (110) plane of from 0.07 to 0.14°, a specific surface area of from 0.3 to 0.7 m²/g, a heat generation initiation temperature of at least 160° C. and a press density of from 3.15 to 3.8 g/cm³.

(7) A positive electrode for a lithium secondary battery containing the lithium-cobalt composite oxide produced by the process as defined in any one of the above (1) to (6).

(8) A lithium secondary battery employing the positive electrode as defined in the above (7).

DETAILED DESCRIPTION OF THE PREFERRED EMBODIMENTS

The lithium-cobalt composite oxide for a positive electrode of a lithium secondary battery produced in the present invention is represented by the formula $Li_pCo_xM_yO_zF_a$. In the formula, M, p, x, y, z and a are as defined above. Particularly, p, x, y, z and a are preferably as follows. $0.97 \leq p \leq 1.03$, $0.990 \leq x \leq 1.0$, $0.0005 \leq y \leq 0.01$, $1.95 \leq z \leq 2.05$, x+y=1 and $0.001 \leq a \leq 0.01$. Here, when a is larger than 0, it is a composite oxide having some of its oxygen atoms substituted by fluorine atoms. In such a case, the safety of the obtained positive electrode active material will be improved.

Further, M is a transition metal element other than Co, or an alkaline earth metal. The transition metal element represents a transition metal of Group 4, Group 5, Group 6, Group 7, Group 8, Group 9, Group 10 or Group 11 of the Periodic Table. Among them, M is preferably at least one element selected from the group consisting of Ti, Zr, Hf, V, Nb, Ta, Mg, Ca, Sr, Ba and Al. Among them, Ti, Zr, Hf, Mg or Al is preferred from the viewpoint of the volume development properties, the safety, the cyclic durability, etc.

In the present invention, in a case where the above M and/or F is contained, each of M and F is preferably present on the surface, or substantially on the surface i.e. preferably, within 100 nm, particularly preferably within 30 nm from the surface, of the lithium cobalt oxide particles. If it is present in the interior of the particles, not only the effect of improving the battery characteristics tends to be small, but also the battery characteristics may decrease in some cases. By the presence of these elements on the surface, the important battery characteristics such as the safety or the charge and discharge cyclic properties can be improved by an addition of a small amount without bringing about the reduction of the battery performance. The presence of these elements on the surface can be judged by carrying out a spectroscopic analysis such as a XPS analysis with respect to the positive electrode particles.

In the lithium-cobalt composite oxide of the present invention, a specific mixture comprising cobalt hydroxide and tricobalt tetroxide is used as the cobalt source. As the cobalt hydroxide, it is preferred to use one which has a half value width of the diffraction peak on (001) plane at 2θ=19±1° of from 0.18 to 0.35° and a half value width of the diffraction peak on (101) plane at 2θ=38±1° of from 0.15 to 0.35°, as measured by the X-ray diffraction using CuKα as the ray source, and a specific surface area of from 5 to 50 m²/g.

In a case where the half value width of the diffraction peak on (001) plane at 2θ=19±1° and the half value width of the diffraction peak on (101) plane at 2θ=38±1° as measured by the X-ray diffraction using CuKα as the ray source, of the cobalt hydroxide, are outside the above-mentioned ranges defined by the present invention, the powder tends to be bulky, the press density of the positive electrode tends to be low, or the safety tends to deteriorate, and thus, the purpose of the present invention can not be accomplished. With respect to the above half value widths, particularly preferred is such that the half value width of the diffraction peak on (001) plane at $2\theta=19\pm1°$ is from 0.22 to 0.30°, and the half value width of the diffraction peak on (101) plane at $2\theta=38\pm1°$ is from 0.18 to 0.30°.

Further, if the specific surface area of the cobalt hydroxide is smaller than 5 m$^2$/g, the press density of the positive electrode tends to be low, and the safety tends to deteriorate. On the other hand, if it exceeds 50 m$^2$/g, the powder tends to be bulky. Particularly preferably, the specific surface area is from 10 to 30 m$^2$/g. Further, if the press density of the cobalt hydroxide is smaller than 1.0 g/cm$^3$, the powder tends to be bulky. On the other hand, if it exceeds 2.5 g/cm$^3$, the press density of the positive electrode tends to be low, such being undesirable.

Further, the press density of the cobalt hydroxide is preferably from 1.0 to 2.5 g/cm$^3$, particularly preferably from 1.3 to 2.2 g/cm$^3$. Here, the press density of the cobalt hydroxide in the present invention is meant for an apparent press density when the particle powder is compressed by a press under a pressure of 0.3 t/cm$^2$, unless otherwise specified. Further, the press density of the lithium-cobalt composite oxide is meant for an apparent press density when compressed by a press under a pressure of 0.96 t/cm$^2$.

Further, the average particle size D50 of the cobalt hydroxide in a state where the secondary particles thereof are dispersed in water is preferably at most ¼, more preferably at most ⅛, of the average particle size D50 prior to being dispersed in water. In such a case, the average particle size D50 in a state where the particles are dispersed in water, is preferably from 5 to 25 μm, particularly preferably from 8 to 20 μm. If the above average particle size is not within the above range, the press density of the positive electrode tends to be low, the large current discharge characteristics or the self-discharge characteristics tend to be low, such being undesirable. Further, such dispersion of the cobalt hydroxide particles in pure water, is carried out under irradiation with ultrasonic waves (42 KHz, 40 W) for 3 minutes.

Further, the shape of the secondary particles of the cobalt hydroxide is preferably substantially spherical. The shape of particles being substantially spherical includes a spherical shape, a rugby ball shape, a polyhedral shape, etc., but the major axis/the minor axis is preferably from 2/1 to 1/1, particularly preferably from 1.5/1 to 1/1. Especially, the particles preferably have a shape as spherical as possible.

On the other hand, the tricobalt tetroxide is preferably one which has a half value width of the diffraction peak on (220) plane at $2\theta=31\pm1°$ of at most 0.5° and a half value width of the diffraction peak on (311) plane at $2\theta=37\pm1°$ of at most 0.5°, as measured by the X-ray diffraction using CuKα as the ray source, and which has a specific surface area of from 0.5 to 20 m$^2$/g. Among them, particularly preferred is one which has a half value width of the diffraction peak on (220) plane at $2\theta=31\pm1°$ of from 0.05 to 0.2° and a half value width of the diffraction peak on (311) plane at $2\theta=37\pm1°$ of from 0.05 to 0.2°. If the half value widths and the specific surface area are outside the ranges defined by the present invention, the powder tends to be bulky, and the reactivity during the firing tends to be low, such being undesirable.

Further, if the specific surface area of the tricobalt pentaoxide is smaller than 0.5 m$^2$/g, the reactivity during the firing tends to be low. On the other hand, if it exceeds 20 m$^2$/g, the powder tends to be bulky, such being undesirable. It is particularly preferred that the specific surface area is from 1 to 10 m$^2$/g. Further, the press density of the tricobalt tetroxide is preferably form 2.5 to 5 g/cm$^3$, particularly preferably from 3 to 4 g/cm$^3$.

Further, the average particle size D50 of the tricobalt tetroxide in a state where the secondary particles thereof are dispersed in water, is preferably from 2 to 10 μm, particularly preferably from 2 to 5 μm. If the above average particle size is outside the above range, it tends to be difficult to insert them into spaces among large particles derived from cobalt hydroxide, such being undesirable.

When the above mixture of the cobalt hydroxide and the tricobalt tetroxide is used as the cobalt source, the former/the latter is required to be from 5/1 to 1/5 by a cobalt atomic ratio. If the cobalt hydroxide or the tricobalt tetroxide is large beyond such a range, the powder tends to be bulky, or the press density of the positive electrode tends to be low, such being undesirable. Particularly preferably, the ratio of the cobalt hydroxide to the tricobalt tetroxide is such that the former/the latter is preferably from 4/1 to 1/4, particularly preferably from 3/2 to 2/3 by a cobalt atomic ratio.

In the present invention, from 700 to 1,050° C. is important as the temperature for firing the above-mentioned mixture comprising the cobalt source, the lithium source and, as the case requires, the M element source and the fluorine source, in an oxygen-containing atmosphere. If the firing temperature is lower than 700° C., the lithium-modification tends to be incomplete, and in a case where it exceeds 1,050° C., the charge and discharge cycle durability or the initial capacity tends to be low. Particularly preferably, the firing temperature is from 900 to 1,000° C. The present invention is advantageous in that a complicated lithium-modification method such as spray drying of a slurry, is not employed. Further, if a method disclosed in JP-A-2002-60225 i.e. an aqueous slurry, is employed, agglomerates of secondary particles will be disintegrated, such being undesirable. The present invention is characterized in that cobalt hydroxide secondary particles having a weak cohesive force are blended in a dry system and fired.

The cobalt hydroxide and the tricobalt tetroxide having the above-mentioned specific physical properties, to be used for the production of the lithium-cobalt composite oxide of the present invention, can be produced by various methods, and their production methods are not particularly limited. For example, by continuously mixing a mixed liquid of an aqueous cobalt sulfate solution with ammonium hydroxide, and a sodium hydroxide aqueous solution, it is readily possible to produce a slurry containing cobalt hydroxide. And, by changing the reaction conditions such as the pH, stirring, etc., at that time, a cobalt hydroxide having the physical properties of the present invention can be obtained. Further, tricobalt tetroxide is produced by subjecting the hydroxide obtained as described above to heat treatment. The present invention is characterized by mixing and firing the cobalt hydroxide having the above-mentioned specific structure and the lithium source. However, in such a cobalt source, if a part of the cobalt hydroxide or the tricobalt tetroxide is substituted by another cobalt source, there may be a case where the battery characteristics or the balance of the productivity for producing the positive electrode, etc. may be improved. As such another cobalt source, cobalt oxyhydroxide may, for example, be exemplified.

In a case where the lithium-cobalt composite oxide is to be prepared by the present invention, lithium carbonate or lithium hydroxide is preferably used as the lithium source. Further, as a raw material for element M to be used as the case requires, a hydroxide, an oxide, a carbonate or a fluoride is preferably selected for use. As the fluorine source, a metal fluoride, LiF or MgF$_2$ may, for example, be selected for use. A mixed powder comprising the cobalt hydroxide, the lithium source, the raw material for element M and the fluorine source, is subjected to firing treatment for from 5 to 20 hours in a oxygen-containing atmosphere at from 800 to 1,050° C. as mentioned above, and the obtained fired product is cooled, then pulverized and classified to obtain lithium-cobalt composite oxide particles.

The lithium-cobalt composite oxide produced in such a manner is preferably such that its average particle size D50 is preferably from 5 to 15 μm, particularly preferably from 8 to 12 μm, the specific surface area is preferably from 0.3 to 0.7 m$^2$/g, particularly preferably from 0.4 to 0.6 m$^2$/g, the half value width of the diffraction peak on (110) plane at 2θ=66.5±1° as measured by the X-ray diffraction using CuKα as the ray source is preferably from 0.07 to 0.14°, particularly preferably from 0.08 to 0.12°, and the press density is preferably from 3.15 to 3.8 g/cm$^3$, particularly preferably from 3.20 to 3.55 g/cm$^3$. Further, the lithium-cobalt composite oxide of the present invention is preferably such that the remaining alkali amount contained therein is at most 0.03 wt %, particularly preferably at most 0.01 wt %.

To produce a positive electrode for a lithium secondary battery from such a lithium-cobalt composite oxide, a carbon type conductive material such as acetylene black, graphite or Ketjenblack and a binding material are mixed with a powder of the composite oxide. As the binding material, preferably polyvinylidene fluoride, polytetrafluoroethylene, polyamide, carboxymethyl cellulose or acrylic resin may, for example, be used.

The powder of the lithium-cobalt composite oxide of the present invention, the conductive material and the binding material are formed into a slurry or a kneaded product by using a solvent or a dispersion medium, which is supported on a positive electrode current collector such as an aluminum foil or stainless steel foil by e.g. coating to form a positive electrode plate for a lithium secondary battery.

In a lithium secondary battery using the lithium-cobalt composite oxide of the present invention as the positive electrode active material, as the separator, a porous polyethylene or a porous propylene film may be used. Further, as a solvent of the electrolyte solution of the battery, various solvents may be used. However, a carbonate ester is preferred. As the carbonate ester, each of a cyclic type and a chain type can be used. As the cyclic carbonate ester, propylene carbonate or ethylene carbonate (EC) may, for example, be mentioned. As the chain carbonate ester, dimethyl carbonate, diethyl carbonate (DEC), ethyl methyl carbonate (EMC), methyl propyl carbonate or methyl isopropyl carbonate may, for example, be mentioned.

In the present invention, the carbonate ester may be used alone or at least two types may be used as mixed. Further, it may be used as mixed with another solvent. Further, according to the material of the negative electrode active material, if the chain carbonate ester is used together with the cyclic carbonate ester, there is a case where the discharge properties, the cyclic durability or the charge and discharge efficiency can be improved.

Further, in the lithium secondary battery using the lithium-cobalt composite oxide of the present invention as the positive electrode active material, a gel polymer electrolyte containing a vinylidene fluoride-hexafluoropropylene copolymer (for example, KYNAR manufactured by ELF Atochem) or a vinylidene fluoride-perfluoropropyl vinyl ether copolymer may be employed. As the solute to be added to the electrolyte solvent or the polymer electrolyte, at least one member of lithium salts is preferably used, wherein e.g. ClO$_4$—, CF$_3$SO$_3$—, BF$_4$—, PF$_6$—, AsF$_6$—, SbF$_6$—, CF$_3$CO$_2$— or (CF$_3$SO$_2$)$_2$N—is anion. It is preferably added at a concentration of from 0.2 to 2.0 mol/L(liter) to the electrolyte solvent or the polymer electrolyte comprising the lithium salt. If the concentration departs from this range, the ionic conductivity will decrease, and the electrical conductivity of the electrolyte will decrease. More preferably, it is from 0.5 to 1.5 mol/L.

In the lithium battery using the lithium-cobalt composite oxide of the present invention as the positive electrode active material, as the negative electrode active material, a material which can occlude and discharge lithium ions may be used. The material forming the negative electrode active material is not particularly limited, however, lithium metal, a lithium alloy, a carbon material, an oxide comprising, as a main body, a metal of Group 14 or Group 15 of the Periodic Table, a carbon compound, a silicon carbide compound, a silicone oxide compound, titanium sulfide or a boron carbide compound may, for example, be mentioned. As the carbon material, an organic material which is subjected to thermal decomposition under various thermal decomposition conditions, artificial graphite, natural graphite, soil graphite, exfoliated graphite or squamation graphite etc. can be used. Further, as the oxide, a compound comprising tin oxide as a main body can be used. As the negative electrode current collector, a copper foil, a nickel foil etc. can be used. The negative electrode is produced preferably by kneading the active material with an organic solvent to form a slurry, which is coated on the metal foil current collector, dried and pressed.

The shape of the lithium battery using the lithium-cobalt composite oxide of the present invention as the positive electrode active material is not particularly limited. Sheet, film, folding, winding type cylinder with bottom or button shape etc. is selected according to use.

Now, the present invention will be explained in further detail with reference to Examples. However, the present invention is by no means restricted to such specific Examples. Examples 1 to 5 and Examples 8 to 10 are Examples of the present invention, and Examples 6 to 7 are Comparative Examples.

EXAMPLE 1

A mixed liquid of an aqueous cobalt sulfate solution and ammonium hydroxide, was continuously mixed with an aqueous sodium hydroxide solution to continuously prepare a cobalt hydroxide slurry by a known method, and via agglomeration, filtration and drying steps, a cobalt hydroxide powder was obtained. The obtained cobalt hydroxide had a half value width of the diffraction peak on (001) plane at 2θ=19±1° of 0.27° and a half value width of the diffraction peak on (101) plane at 2θ=38±1° of 0.23°, by the powder X-ray diffraction using CuKα-ray. Further, as a result of the scanning electron microscopic observation, it was found that the product was composed of substantially spherical secondary particles formed by agglomeration of fine particles of no specific shape. As a result of the volume based particle size distribution analysis, as obtained from the analysis of the image as observed by the scanning electron microscope, the average particle size D50 was 17.5 μm, D10 was 7.1 μm, and D90 was 26.4 μm.

Such secondary particles of the cobalt hydroxide were dispersed in pure water, whereby the secondary particles were easily disintegrated to form a suspension composed mainly of primary particles, whereby the cohesive force of the secondary particles was found to be weak. Further, the particle size distribution of such a secondary particle powder was measured by means of a laser scattering system particle size distribution measuring apparatus by using water as a dispersant after irradiation with ultrasonic waves (42 kHz, 40 W) for 3 minutes, whereby the average particle size D50 was 0.75 µm, D10 was 0.3 µm and D90 was 1.6 µm. Further, the slurry after the measurement of the average particle size was dried and observed by a scanning electron microscope, whereby the shape of secondary particles before the measurement was not observed. The specific surface area of the cobalt hydroxide particles composed of secondary particles was 17.1 m$^2$/g, and the press density was 1.75 g/cm$^3$, and the product was a substantially spherical cobalt hydroxide powder wherein primary particles were weakly agglomerated.

As the tricobalt tetroxide, tricobalt tetroxide was used which had an average particle size D50 of 2.8 µm, D10 of 1.6 µm and D90 of 4.0 µm, as measured in the same manner by means of a laser scattering system particle size distribution measuring apparatus by using water as a dispersant, and which had a specific surface area of 1.2 m$^2$/g as measured by a BET method. This tricobalt tetroxide was observed by a scanning electron microscope, whereby it was found to be in the form of secondary particles formed by agglomeration of primary particles. This tricobalt tetroxide had a half value width of the diffraction peak on (220) plane at $2\theta=31\pm1°$ of 0.11° and a half value width of the diffraction peak on (311) plane at $2\theta=37\pm1°$ of 0.135°.

A powder mixture of the above cobalt hydroxide and tricobalt tetroxide (in a cobalt atomic ratio of 1:1) and a lithium carbonate powder were dry-blended so that the atomic composition after firing would be $LiCoO_2$. The tap density of the blended powder obtained was 1.30 g/cm$^3$. This blended powder was fired at 950° C. for 12 hours in air. The fired product was pulverized, and the particle size distribution of the obtained $LiCoO_2$ powder formed by agglomeration of primary particles, was measured by means of a laser scattering type particle size distribution measuring apparatus using water as a dispersant, whereby the average particle size D50 was 8.9 µm, D10 was 4.7 µm, and D90 was 21.9 µm. Further, the specific surface area obtained by the BET method was 0.44 m$^2$/g. In the present invention, the tap density was obtained in accordance with JIS R9301-2-3.

10 g of the above $LiCoO_2$ powder was dispersed in 100 g of pure water, and after filtration, potentiometric titration was carried out with 0.1 N HCl to obtain the remaining alkali amount, which was found to be 0.02 wt %. Further, with respect to such a powder, the X-ray diffraction spectrum was obtained by an X-ray diffraction apparatus (RINT 2100 model, manufactured by Rigaku Corporation). In the powder X-ray diffraction using CuKα-ray, the half value width of the diffraction peak on (110) plane at $2\theta=66.5\pm1°$ was 0.095°, and the press density was 3.40 g/cm$^3$.

The above powder, acetylene black and a polyvinylidene fluoride powder were mixed in a mass ratio of 90/5/5, and N-methyl pyrrolidone was added to prepare a slurry, which was applied on one side of an aluminum foil having a thickness of 20 µm by means of a doctor blade. It was dried and rolled by a roll press to obtain a positive electrode sheet for a lithium battery. The density of the electrode layer was determined from the thickness of the positive electrode after rolling and the weight per unit volume of the electrode layer and found to be 3.45 g/cm$^3$.

Then, using one punched out from the positive electrode body sheet as a positive electrode, using a metal lithium foil with a thickness of 500 µm as a negative electrode, using a nickel foil of 20 µm as a negative electrode current collector, using a porous polypropylene with a thickness of 25 µm as a separator, and using as an electrolyte solution a 1M $LiPF_6$/EC+DEC (1:1) solution (it means a mixed solution of EC and DEC in a mass ratio (1:1) comprising $LiPF_6$ as a solute, the same applies hereinafter), two simple sealed cell type lithium batteries made of stainless steel were assembled in an argon globe box.

One of these batteries employing the EC+DEC (1:1) solution as the electrolyte solution was charged up to 4.3 V at a load current of 75 mA per 1 g of the positive electrode active material at 25° C., and discharged down to 2.5 V at a load current of 75 mA per 1 g of the positive electrode active material, whereby the initial discharge capacity was obtained. Further, the volume capacity density was obtained from the density of the electrode layer and the capacity per weight. With respect to this battery, the charge and discharge cycle test was further carried out 30 times. As a result, the initial volume capacity density of the positive electrode layer at 25° C. at a voltage of from 2.5 to 4.3 V was 465 mAh/cm$^3$ electrode layer, the initial weight capacity density was 163 mAh/g-$LiCoO_2$, and the capacity retention after 30 times of charge and discharge cycle, was 97.2%.

Further, with respect to the other battery employing the EC+DEC (1:1) solution as the electrolyte solution, the other battery was charged for 10 hours at 4.3 V, and then disassembled in the argon globe box. The positive electrode body sheet after charging was taken out, and after the positive electrode body sheet was washed, it was punched out with a diameter of 3 mm, and then sealed in an aluminum capsule with EC. And then, it was heated at a rate of 5° C./min by using a scanning differential calorimeter, whereby the heat generation starting temperature was measured. As a result, the heat generation starting temperature of the 4.3 V charged material was 161° C.

EXAMPLE 2

A $LiCoO_2$ powder was prepared in the same manner as in Example 1 except that in Example 1, the blend ratio of the tricobalt tetroxide to the cobalt hydroxide was changed to 70:30 (by a cobalt atomic ratio). The blend ratio of the tricobalt tetroxide, the cobalt hydroxide and the lithium carbonate was adjusted so that the composition would be $LiCoO_2$ after firing. The tap density of the blended powder was 1.7 g/cm$^3$. The obtained $LiCoO_2$ had an average particle size D50 of 7.1 µm, D10 of 3.0 µm and D90 of 17.6 µm and had a specific surface area of 0.5 m$^2$/g as obtained by the BET method.

With respect to the above powder, the X-ray diffraction spectrum was obtained by using an X-ray diffraction apparatus (RINT 2100 model, manufactured by Rigaku Corporation). In the powder X-ray diffraction using CuKα-ray, the half value width of the diffraction peak on (110) plane at $2\theta=66.5\pm1°$ was 0.097°. The press density of the powder was 3.15 g/cm$^3$, and the remaining alkali amount was 0.02 wt %.

In the same manner as in Example 1, a positive electrode sheet was prepared by using the above powder, and the properties as the positive electrode active material for a lithium secondary battery were obtained, whereby the initial weight capacity density at 25° C. at a voltage of from 2.5 to 4.3 V was 161 mAh/g-$LiCoO_2$, and the capacity retention after 30 times of charge and discharge cycle was 97.1%. Further, the heat generation starting temperature of the 4.3 V charged material was 162° C.

EXAMPLE 3

A $LiCoO_2$ powder was prepared in the same manner as in Example 1 except that in Example 1, the blend ratio of the tricobalt tetroxide to the cobalt hydroxide was changed to 30:70 (by a cobalt atomic ratio). The blend ratio of the tricobalt tetroxide, the cobalt hydroxide and the lithium carbonate was adjusted so that the composition would be $LiCoO_2$ after firing. The tap density of the blended powder was 1.1 g/cm$^3$. The obtained $LiCoO_2$ had an average particle size D50 of 10.2 μm, D10 of 6.0 μm and D90 of 24.6 μm and had a specific surface area of 0.5 m$^2$/g as obtained by the BET method.

With respect to the $LiCoO_2$ powder, the X-ray diffraction spectrum was obtained by using an X-ray diffraction apparatus (RINT 2100 model, manufactured by Rigaku Corporation). In the powder X-ray diffraction using CuKα-ray, the half value width of the diffraction peak on (110) plane at 2θ=66.5±1° was 0.099°. The obtained $LiCoO_2$ powder had a press density of 3.43 g/cm$^3$, as pressed under a pressure of 0.96 t/cm$^2$ by a press. The remaining alkali amount of $LiCoO_2$ was 0.02 wt %.

In the same manner as in Example 1, a positive electrode sheet was prepared by using the above powder, and the properties as the positive electrode active material of a lithium secondary battery were obtained, whereby the initial weight capacity density at 25° C. at a voltage of from 2.5 to 4.3 V was 163 mAh/g-$LiCoO_2$, and the capacity retention after 30 times of charge and discharge cycle, was 98.0%. Further, the heat generation starting temperature of the 4.3 V charged material was 160° C.

EXAMPLE 4

A $LiCoO_2$ powder was prepared in the same manner as in Example 1 except that in Example 1, the blend ratio of the tricobalt tetroxide to the cobalt hydroxide was changed to 60:40 (by a cobalt atomic ratio). The blend ratio of the tricobalt tetroxide, the cobalt hydroxide and the lithium carbonate was adjusted so that the composition would be $LiCoO_2$ after firing. The tap density of the blended powder was 1.1 g/cm$^3$. The obtained $LiCoO_2$ had an average particle size D50 of 7.7 μm, D10 of 3.8 μm and D90 of 20.2 μm and had a specific surface area of 0.47 m$^2$/g as obtained by the BET method.

With respect to the $LiCoO_2$ powder, the X-ray diffraction spectrum was obtained by using an X-ray diffraction apparatus (RINT 2100 model, manufactured by Rigaku Corporation). In the powder X-ray diffraction using CuKα-ray, the half value width of the diffraction peak on (110) plane at 2θ=66.5±1°, was 0.095°. The obtained $LiCoO_2$ powder had a press density of 3.30 g/cm$^3$, as pressed under a pressure of 0.96 t/cm$^2$ by a press. The remaining alkali amount of $LiCoO_2$ was 0.02 wt %.

In the same manner as in Example 1, a positive electrode sheet was prepared by using the above powder, and the properties as the positive electrode active material of a lithium secondary battery were obtained, whereby the initial weight capacity density at 25° C. at a voltage of from 2.5 to 4.3 V was 161 mAh/g-$LiCoO_2$, and the capacity retention after 30 times of charge and discharge cycle, was 97.4%. Further, the heat generation starting temperature of the 4.3 V charged material was 161° C.

EXAMPLE 5

A positive electrode active material was prepared in the same manner as in Example 1 except that in Example 1, when the tricobalt tetroxide, the cobalt hydroxide and the lithium carbonate were mixed, a titanium oxide powder and a lithium fluoride powder were further added.

The tap density of the blend powder was 1.30 g/cm$^3$, and as a result of the elemental analysis, the composition was $LiCo_{0.997}Ti_{0.003}O_{1.998}F_{0.002}$. The fired product was pulverized to obtain a substantially spherical powder which had an average particle diameter D50 of 9.0 μm, D10 of 3.0 μm and D90 of 21.0 μm, when the particle size distribution of the powder formed by agglomeration of primary particles was measured by means of a laser scattering type particle size distribution measuring apparatus using water as a dispersant, and had a specific surface area of 0.43 m$^2$/g as obtained by the BET method. The remaining alkali amount of this powder was 0.02 wt %.

With respect to this powder, the X-ray diffraction spectrum was obtained by using an X-ray diffraction apparatus (RINT 2100 model, manufactured by Rigaku Corporation). In the powder X-ray diffraction using CuKα-ray, the half value width of the diffraction peak on (110) plane at 2θ=66.5±1°, was 0.115°. The press density of the positive electrode powder was 3.35 g/cm$^3$. As a result of the XPS spectroscopic analysis, titanium and fluorine were found to be localized at the surface.

The above powder, acetylene black and a polyvinylidene fluoride powder were mixed in a mass ratio of 90/5/5, and N-methyl pyrrolidone was added to prepare a slurry, which was applied on one side of an aluminum foil having a thickness of 20 μm by means of a doctor blade. It was dried and rolled by a roll press to obtain a positive electrode sheet for a lithium battery.

Then, using one punched out from the positive electrode body sheet as a positive electrode, using a metal lithium foil with a thickness of 500 μm as a negative electrode, using a nickel foil of 20 μm as a negative electrode current collector, using a porous polypropylene with a thickness of 25 μm as a separator, and using as an electrolyte solution a 1M $LiPF_6$/EC+DEC (1:1) solution (it means a mixed solution of EC and DEC in a mass ratio (1:1) comprising $LiPF_6$ as a solute, the same applies hereinafter), two simple sealed cell type lithium batteries made of stainless steel were assembled in an argon globe box.

One of these batteries employing the EC+DEC (1:1) solution as the electrolyte solution was charged up to 4.3 V at a load current of 75 mA per 1 g of the positive electrode active material at 25° C., and discharged down to 2.5 V at a load current of 75 mA per 1 g of the positive electrode active material, whereby the initial discharge capacity was obtained. Further, the volume capacity density was obtained from the density of the electrode layer and the capacity per weight. With respect to this battery, the charge and discharge cycle test was further carried out 30 times. As a result, the initial weight capacity density was 160 mAh/g-$LiCoO_2$, and the capacity retention after 30 times of charge and discharge cycle, was 99.4%.

Further, with respect to the other battery employing the EC+DEC (1:1) solution as the electrolyte solution, the other battery was charged for 10 hours at 4.3 V, and then disassembled in the argon globe box. The positive electrode body sheet after charging was taken out, and after the positive electrode body sheet was washed, it was punched out with a diameter of 3 mm, and then sealed in an aluminum capsule with EC. And then, it was heated at a rate of 5° C./min by using a scanning differential calorimeter, whereby the heat generation starting temperature was measured. As a result, the heat generation starting temperature of the 4.3 V charged material was 170° C.

EXAMPLE 6

$LiCoO_2$ was prepared in the same manner as in Example 1 except that in Example 1, only tricobalt tetroxide was used as the cobalt source. The blend ratio of the tricobalt tetroxide and the lithium carbonate was adjusted so that the composition would be $LiCoO_2$ after firing. The tap density of the blended powder was 2.5 g/cm³. The press density of the obtained LiCoO₂ powder was 3.04 g/cm³.

In the same manner as in Example 1, a positive electrode sheet was prepared by using the above powder, and the properties as the positive electrode active material for a lithium secondary battery were obtained, whereby the initial weight capacity density at 25° C. at a voltage of from 2.5 to 4.3 V was 159 mAh/g-LiCoO₂, and the capacity retention after 30 times of charge and discharge cycle was 94.8%. Further, the heat generation starting temperature of the 4.3 V charged material was 161° C.

EXAMPLE 7

LiCoO₂ was prepared in the same manner as in Example 1 except that in Example 1, only cobalt hydroxide was used as the cobalt source. The blend ratio of the cobalt hydroxide and the lithium carbonate was adjusted so that the composition would be LiCoO₂ after firing. The tap density of the blended powder was 0.78 g/cm³. The apparent density after pressing of the obtained LiCoO₂ powder was 3.48 g/cm³.

In the same manner as in Example 1, a positive electrode sheet was prepared by using the above powder, and the properties as a positive electrode active material for a lithium secondary battery were obtained, whereby the initial weight capacity density at 25° C. at a voltage of from 2.5 to 4.3 V was 159 mAh/g-LiCoO₂, and the capacity retention after 30 times of charge and discharge cycle, was 97.0%. Further, the heat generation starting temperature of the 4.3 V charged material was 160° C.

EXAMPLE 8

A positive electrode active material was prepared in the same manner as in Example 5 except that in Example 5, aluminum hydroxide was used instead of titanium oxide. As a result of the chemical analysis, the composition was found to be $LiCo_{0.997}Al_{0.003}O_{1.998}F_{0.002}$, and the press density of this powder was 3.40 g/cm³. Further, aluminum and fluorine were found to be localized at the surface. The remaining alkali amount was 0.02 wt %. The initial capacity was 160 mAh/g, and the capacity retention after 30 cycle was 99.4%, and the heat generation starting temperature was 169° C.

EXAMPLE 9

A positive electrode active material was prepared in the same manner as in Example 5 except that in Example 5, magnesium hydroxide was used instead of titanium oxide. As a result of the chemical analysis, the composition was found to be $LiCo_{0.997}Mg_{0.003}O_{1.998}F_{0.002}$, and the press density of this powder was 3.40 g/cm³. Further, magnesium and fluorine were found to be localized at the surface. The remaining alkali amount was 0.02 wt %. The initial capacity was 159 mAh/g, and the capacity retention after 30 cycle, was 99.6%, and the heat generation starting temperature was 172° C.

EXAMPLE 10

A positive electrode active material was prepared in the same manner as in Example 5 except that in Example 5, zirconium oxide was used instead of titanium oxide. As a result of the chemical analysis, the composition was found to be $LiCo_{0.997}Zr_{0.003}O_{1.998}F_{0.002}$, and the press density of this powder was 3.39 g/cm³. Further, aluminum and fluorine were found to be localized at the surface. The remaining alkali amount was 0.02 wt %. The initial capacity was 161 mAh/g, the capacity retention after 30 cycle was 99.4%, and the heat generation starting temperature was 171° C.

INDUSTRIAL APPLICABILITY

The present invention provides a process for producing a lithium-cobalt composite oxide for a positive electrode of a lithium secondary battery, which has a large volume capacity density, high safety, high charge and discharge cycle durability, high press density and high productivity, a positive electrode for a lithium secondary battery containing the lithium-cobalt composite oxide thus produced, and a lithium secondary battery.

The entire disclosure of Japanese Patent Application No. 2002-348289 filed on Nov. 29, 2002 including specification, claims and summary is incorporated herein by reference in its entirety.

What is claimed is:

1. A process for producing a lithium-cobalt composite oxide for a positive electrode of a lithium secondary battery, said lithium-cobalt composite oxide being represented by the formula $Li_pCo_xM_yO_zF_a$ (wherein M is a transition metal element other than Co, or an alkaline earth metal element, $0.9 \leq p \leq 1.1$, $0.980 \leq x \leq 1.000$, $0 \leq y \leq 0.02$, $1.9 \leq z \leq 2.1$, x+y=1, and $0 \leq a \leq 0.02$), which comprises firing a mixture comprising a cobalt source and a lithium source in an oxygen-containing atmosphere, characterized in that as the cobalt source, a mixture is used which comprises cobalt hydroxide in the form of substantially spherical secondary particles with an average particle size of from 8 to 20 µm formed by agglomeration of primary particles and tricobalt tetroxide in the form of secondary particles with an average particle size of from 2 to 10 µm formed by agglomeration of primary particles, in a cobalt atomic ratio of from 5:1 to 1:5, and the firing is carried out at from 700 to 1,050° C.

2. The process according to claim 1, wherein the average particle size D50 after dispersing the secondary particles of cobalt hydroxide in pure water, is at most ¼ of the initial average particle size D50.

3. The process according to claim 1, wherein in the X-ray diffraction spectrum using Cu-Kα-ray, of cobalt hydroxide, the half value width of the diffraction peak on (001) plane at 2θ=19±1° is from 0.18 to 0.35°, and the half value width of the diffraction peak on (101) plane at 2θ=38±1° is from 0.15 to 0.35°, and the specific surface area is from 5 to 50 m²/g.

4. The process according to claim 1, wherein the cobalt hydroxide has a press density of from 1.0 to 2.5 g/cm³.

5. The process according to claim 1, wherein in the X-ray diffraction spectrum using Cu-Kα-ray, of tricobalt tetroxide, the half value width of the diffraction peak on (220) plane at 2θ=31±1° is at most 0.5°, and the half value width of the diffraction peak on (311) plane at 2θ=37±1° is at most 0.5°, and the specific surface area is from 0.5 to 20 m²/g.

6. The process according to claim 1, wherein the lithium-cobalt composite oxide has a half value width of the diffraction peak on its (110) plane of from 0.07 to 0.14°, a specific surface area of from 0.3 to 0.7 m²/g, a heat generation initiation temperature of at least 160° C. and a press density of from 3.15 to 3.8 g/cm³.

7. A positive electrode for a lithium secondary battery containing the lithium-cobalt composite oxide produced by the process as defined in claim 1.

8. A lithium secondary battery employing the positive electrode as defined in claim 7.

* * * * *